United States Patent [19]
McLaurin et al.

[11] Patent Number: 5,311,957
[45] Date of Patent: May 17, 1994

[54] STEERING LINKAGE

[75] Inventors: Colin A. McLaurin, Crozet, Va.; Kao-Chi Chung, Blawnox, Pa.

[73] Assignee: Center for Innovative Technology, Herndon, Va.

[21] Appl. No.: 121,172

[22] Filed: Sep. 13, 1993

Related U.S. Application Data

[63] Continuation of Ser. No. 790,397, Nov. 12, 1991, abandoned.

[51] Int. Cl.$^5$ .................. B60K 17/30; B62D 7/09
[52] U.S. Cl. .................. 180/253; 180/907; 280/95.1
[58] Field of Search .................. 180/65.1, 253, 907; 280/95.1, 98, 250.1

[56]  References Cited
U.S. PATENT DOCUMENTS

| | | | |
|---|---|---|---|
| 593,357 | 11/1897 | Lanchester | 280/95.1 |
| 2,368,142 | 1/1945 | Kelley | 280/265 |
| 2,488,989 | 11/1949 | Smallwood | 280/95.1 |
| 2,646,291 | 7/1953 | Chambers et al. | 280/103 |
| 3,027,963 | 4/1962 | Nicholson | 180/144 |
| 4,195,858 | 4/1980 | Goodacre | 280/95.1 |
| 4,220,348 | 9/1980 | Low | 280/95.1 |
| 4,277,078 | 7/1981 | Root | 280/269 |
| 4,483,405 | 11/1984 | Noda et al. | 180/6.5 |
| 4,515,380 | 5/1985 | Schumacher | 280/93 |
| 4,852,679 | 8/1989 | Fry | 180/234 |
| 4,967,864 | 11/1990 | Boyer et al. | 180/65.1 |

FOREIGN PATENT DOCUMENTS 685921  7/1930  France .................. 280/95.1

Primary Examiner—David M. Mitchell
Assistant Examiner—Andrew C. Pike
Attorney, Agent, or Firm—Whitham & Marhoefer

[57]  ABSTRACT

A steering linkage in which a pair of steering arms rotatably mounted on the vehicle frame are jointed by a tie rod to form, in combination, a parallelogram. For each wheel, a steering arm slidably engages a crank arm secured to a king pin that rotatably mounts the wheel to the frame. The pivot point of each steering arm is arranged so that a given angular rotation of both steering arms produces a differential angular wheel rotation that maintains the point of intersection of the steered wheel axes proximate the axis of the fixed wheels or more generally, the rotational axis of all wheels proximate a fixed point.

11 Claims, 14 Drawing Sheets

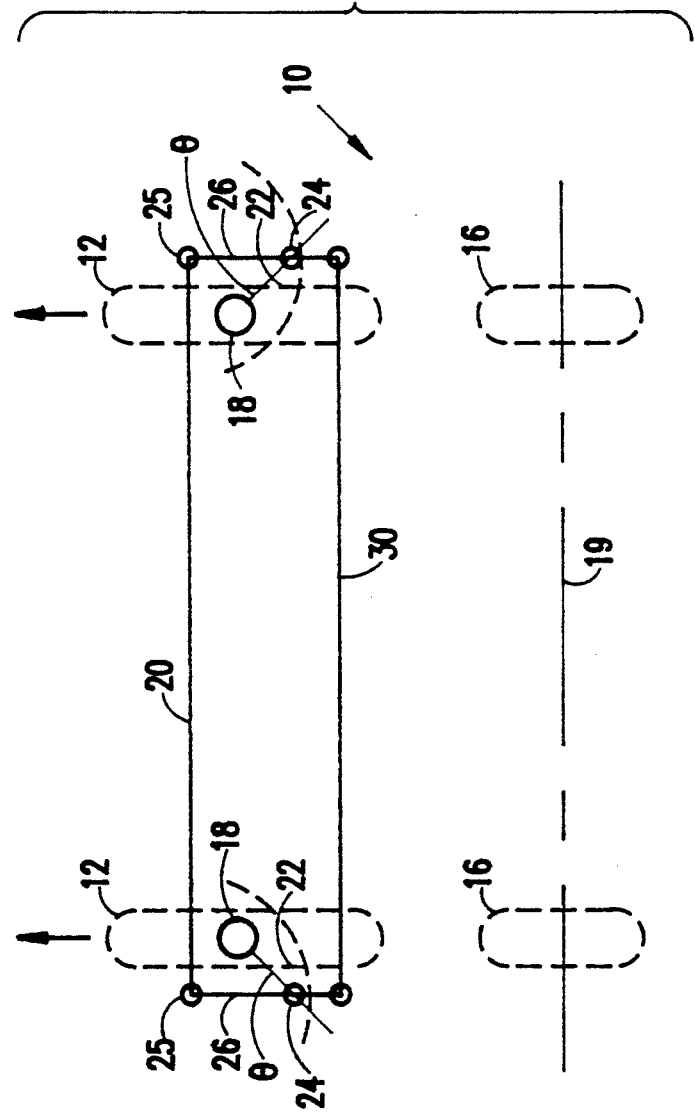

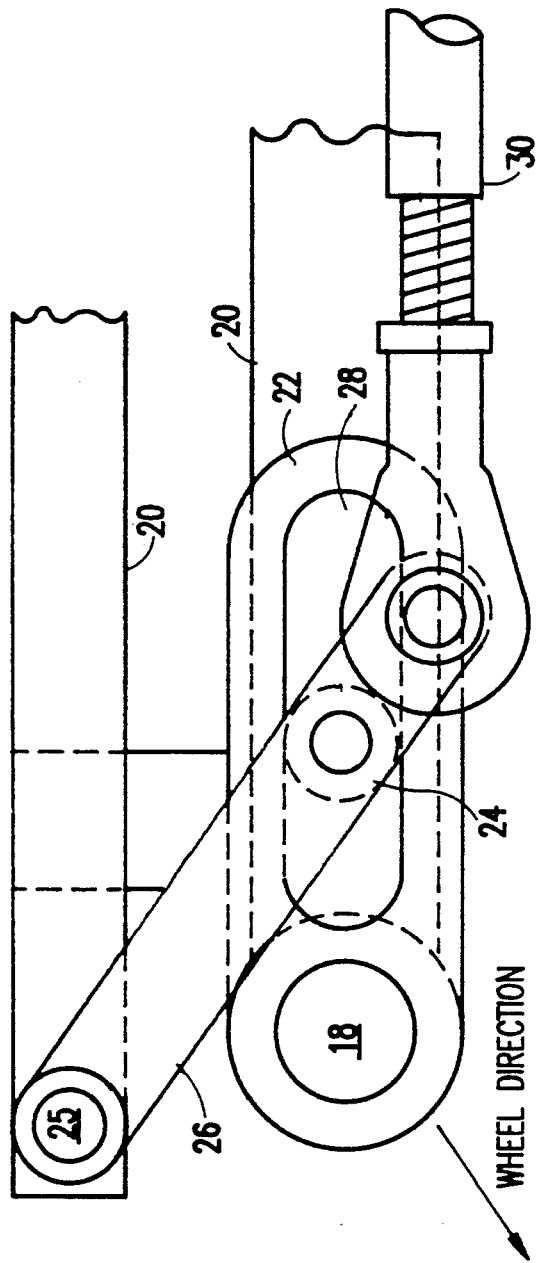

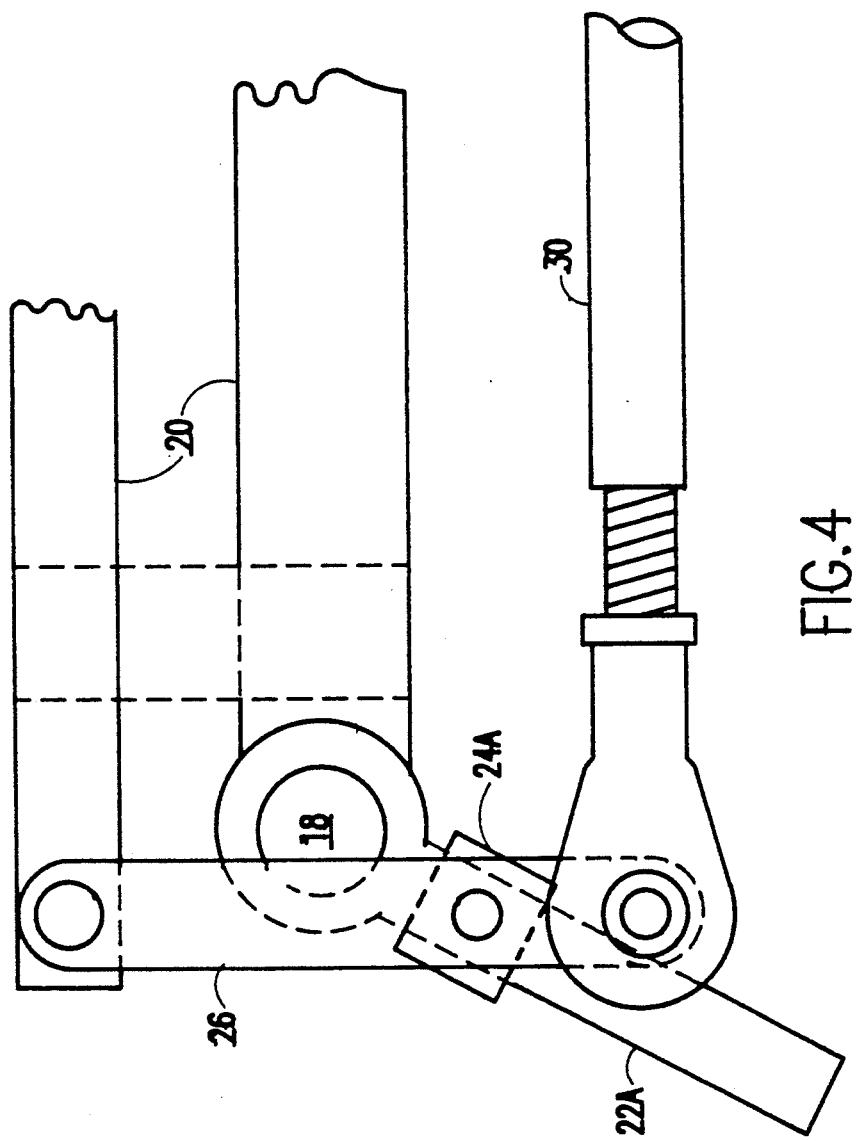

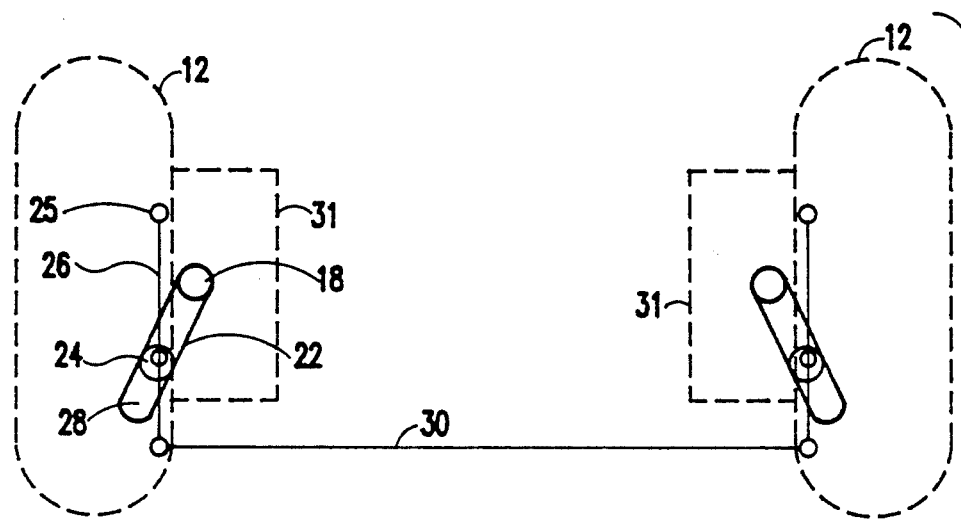
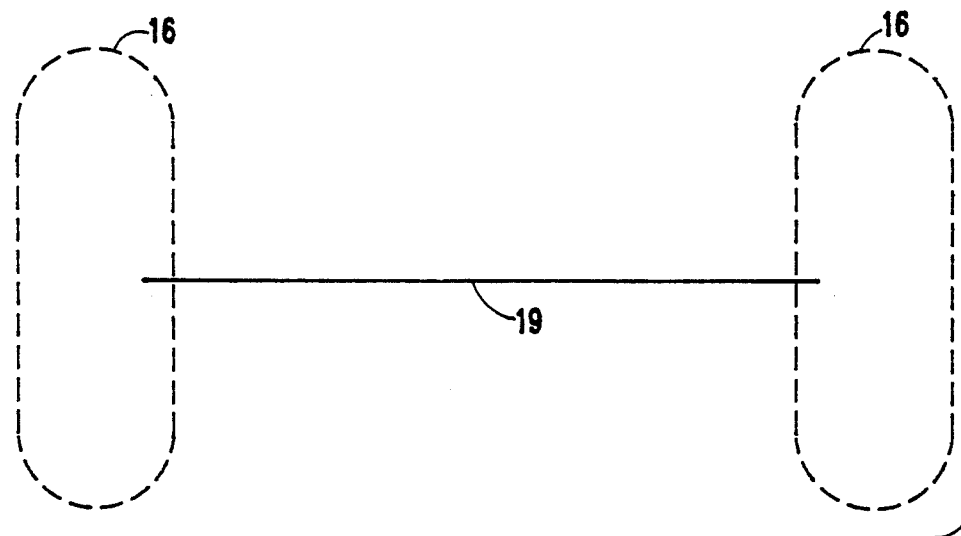
FIG.5A

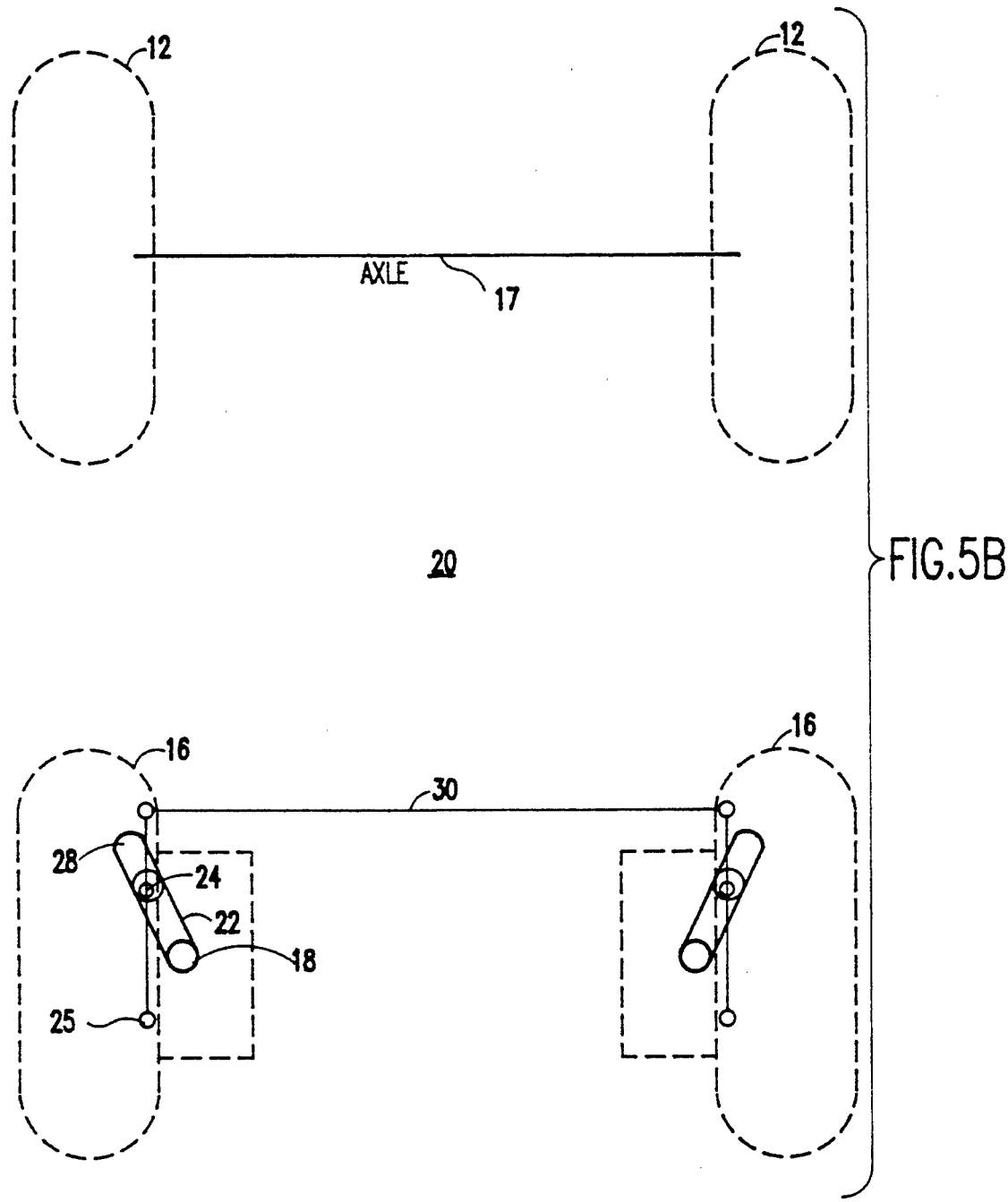

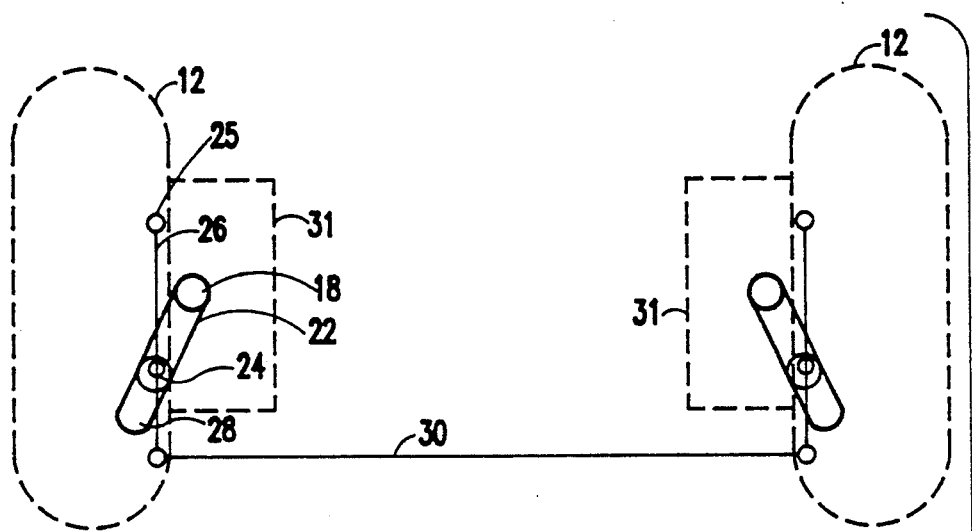
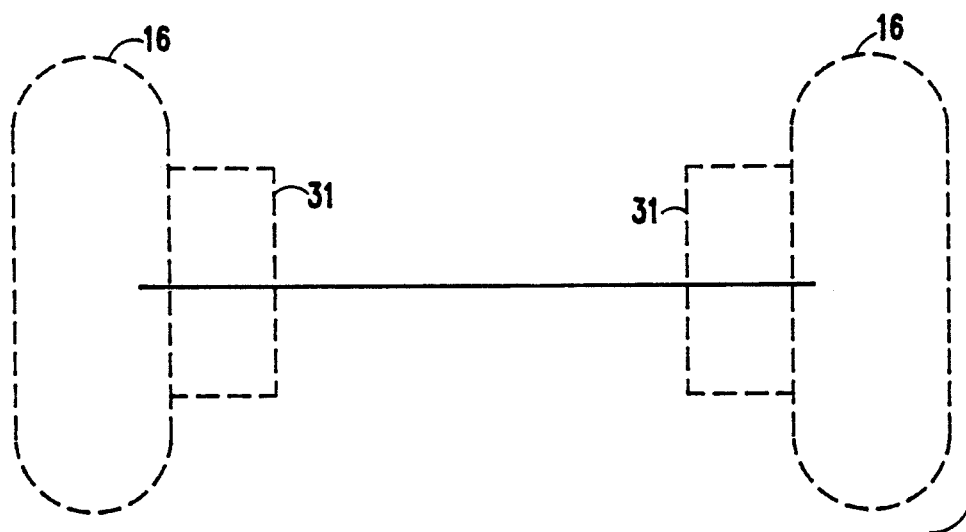
FIG. 5C

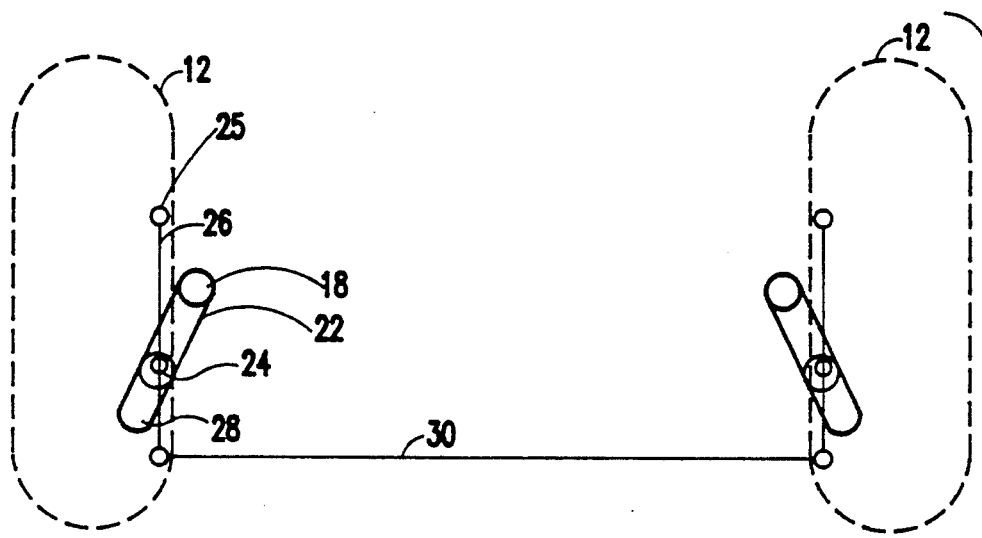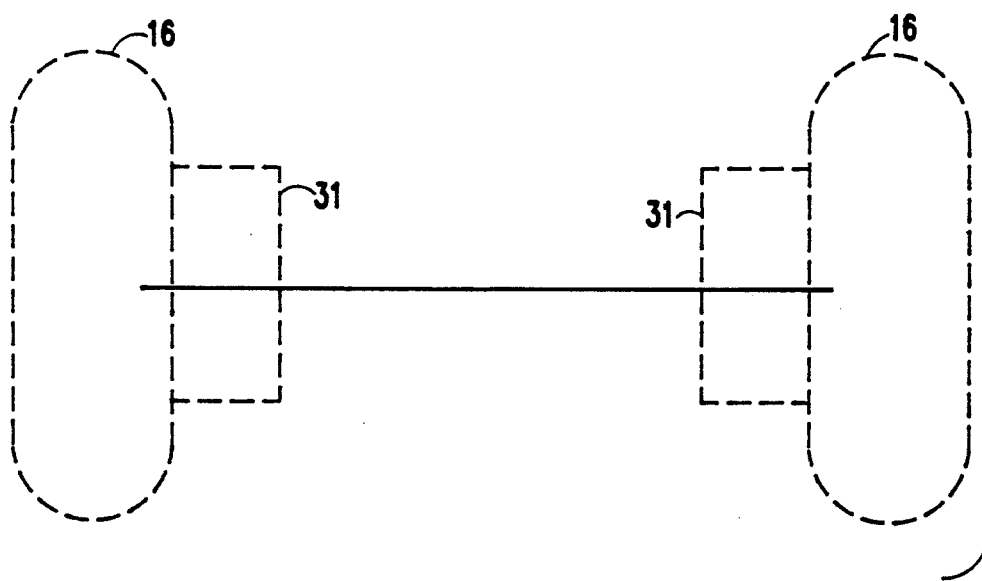
FIG.5F

STEERING LINKAGE

This application is a continuation of U.S. Ser. No. 07/790,397, filed Nov. 12, 1991, now abandoned.

BACKGROUND OF THE INVENTION

1. Field of the Invention

The present invention generally relates to a short turning radius steering linkage based on the so-called Ackerman Steering Principal in which all wheels rotate on a circle with a common center; an improved linkage that is particularly well suited for use with front-wheel-drive wheelchairs.

Front-wheel-drive wheelchairs provide good tracting, dynamic stability, and accurate steering control. Although not limited to such applications, this invention is particularly well adapted for use as a steering system for front-wheel-drive wheelchairs.

2. Description of the Prior Art

The following patents relate to short turning radius steering systems.

U.S. Pat. No. 4,515,380, to Schumacher, discloses a steering linkage that has unequal angles of turn for two-steerable wheels of a vehicle. Each wheel is turned through a gear. While driving one or each of the gears by means of a steering drive element in the same direction of rotation, the positive engagement of the two gears through the pinion and the eccentric mounting of the pinion on the swing arm produce a larger angle of turn of the wheel running inside the turn as compared to the angle of turn of the wheel running at the outside of the turn.

U.S. Pat. No. 4,195,858, to Goodacre, discloses a steering linkage for a pair of wheels with upright pivot axes comprised of links and pivots. Torque can be applied to each wheel via a pivotal connection to an intermediate link when control links are pivoted about their fixed pivots by a drive applied through a tie bar. Each wheel can be rotated about its pivot axis by at least 180°, and the turning circles of the wheels have a common center which, when the wheels are steered describes a line parallel to the line which joins the pivot axes of the wheels. In a four-wheeled vehicle the described line is coincident with the rotational axes of the second set of wheels.

U.S. Pat. No. 2,368,142, to Kelley, discloses a wheelchair having large front wheels mounted on fixed axles, and a pair of smaller steered rear wheels. The two rear wheels are linked together via cams and a chain mechanism for turning the rear wheels at different angles. The patent describes turning of the rear wheels so that their axes intersect along the line corresponding with the axis of the front wheels. When the intersection point is disposed midway between the front wheels, the turning radius is at a minimum.

These prior art proposals have not proven to be altogether satisfactory in terms of their operation and/or economy of implementation.

SUMMARY OF THE INVENTION

It is therefore an object of the present invention to provide a relatively simple, economical steering linkage; one that is particularly well suited for use in a front-wheel-drive wheelchair.

Briefly, this invention contemplates a steering linkage in which a pair of steering arms rotatably mounted on the vehicle frame are jointed by a tie rod to form, in combination, a parallelogram. For each wheel, a steering arm slidably engages a crank arm secured to a king pin that rotatably mounts the wheel to the frame. The pivot point of each steering arm is arranged so that a given angular rotation of both steering arms produces a differential angular wheel rotation that maintains the point of intersection of the steered wheel axes proximate the axis of the fixed wheels or more generally, the rotational axis of all wheels proximate a fixed point.

BRIEF DESCRIPTION OF THE DRAWINGS

The foregoing and other objects, aspects and advantages will be better understood from the following detailed description of a preferred embodiment of the invention with reference to the drawings where like reference numerals have been used to designate like parts in the various views, and, in which:

FIGS. 1A, 1B and 1C are schematic diagrams of a four-wheel vehicle with a steering linkage in accordance with the teachings of this invention; FIG. 1A illustrates the linkage with the wheels in a straight-ahead position. FIG. 1B illustrates the linkage with the wheels in a full left-turn position, and FIG. 1C illustrates the linkage with the wheels in an intermediate left-turn position.

FIGS. 2A, 2B and 2C are detail plan views of a preferred embodiment of linkage for any one of pair of steering wheels (here the left wheel) in accordance with the teachings of this invention; FIG. 2A illustrates the steering system alignment for a straight-ahead wheel position; FIG. 2B illustrates the steering linkage alignment for a full left-hand turn, and FIG. 2C illustrates the steering linkage alignment for a full right-hand turn.

FIG. 4 is another view similar to FIG. 2A showing yet another alternate embodiment of the invention, an embodiment that may also be used in combination with the embodiment of FIG. 3.

FIGS. 5A through 5F show various alternate motorized embodiments of the invention, particularly motorized wheelchairs.

FIG. 5A shows a front-wheel drive; FIG. 5B shows a rear-wheel drive; FIG. 5C shows a four-wheel drive; FIGS. 5D and 5E show four-wheel drive and four-wheel steering; and FIG. 5F shows differential rear-wheel drive.

DETAILED DESCRIPTION OF A PREFERRED EMBODIMENT OF THE INVENTION

Figure 1B:
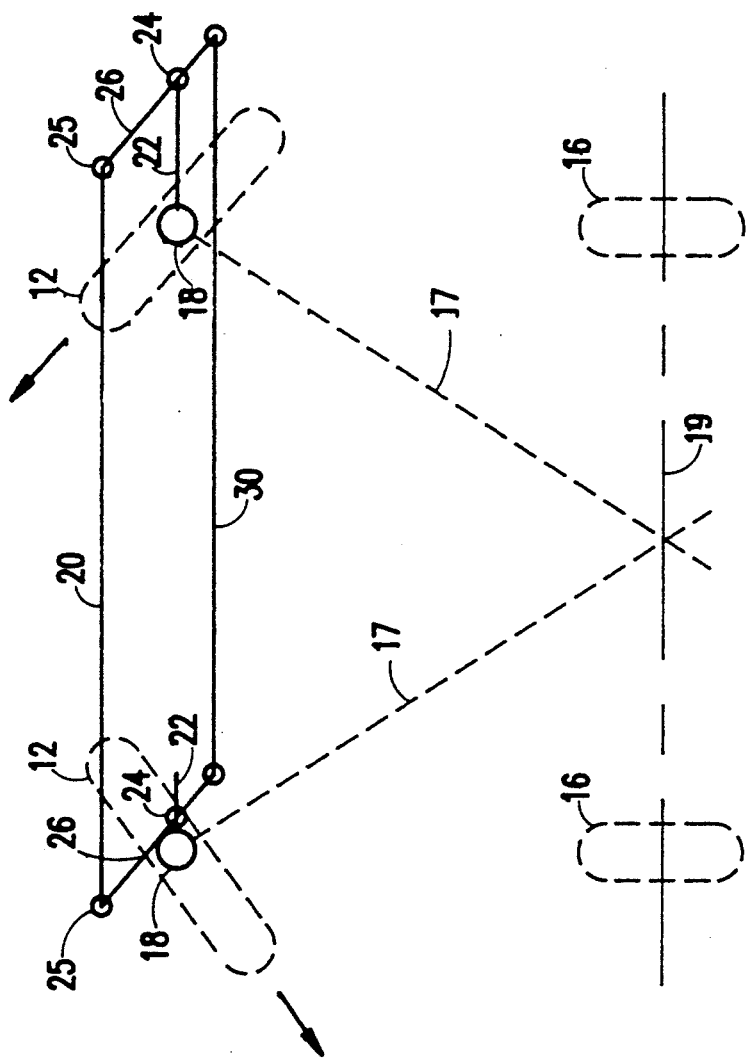
Figure 2A:
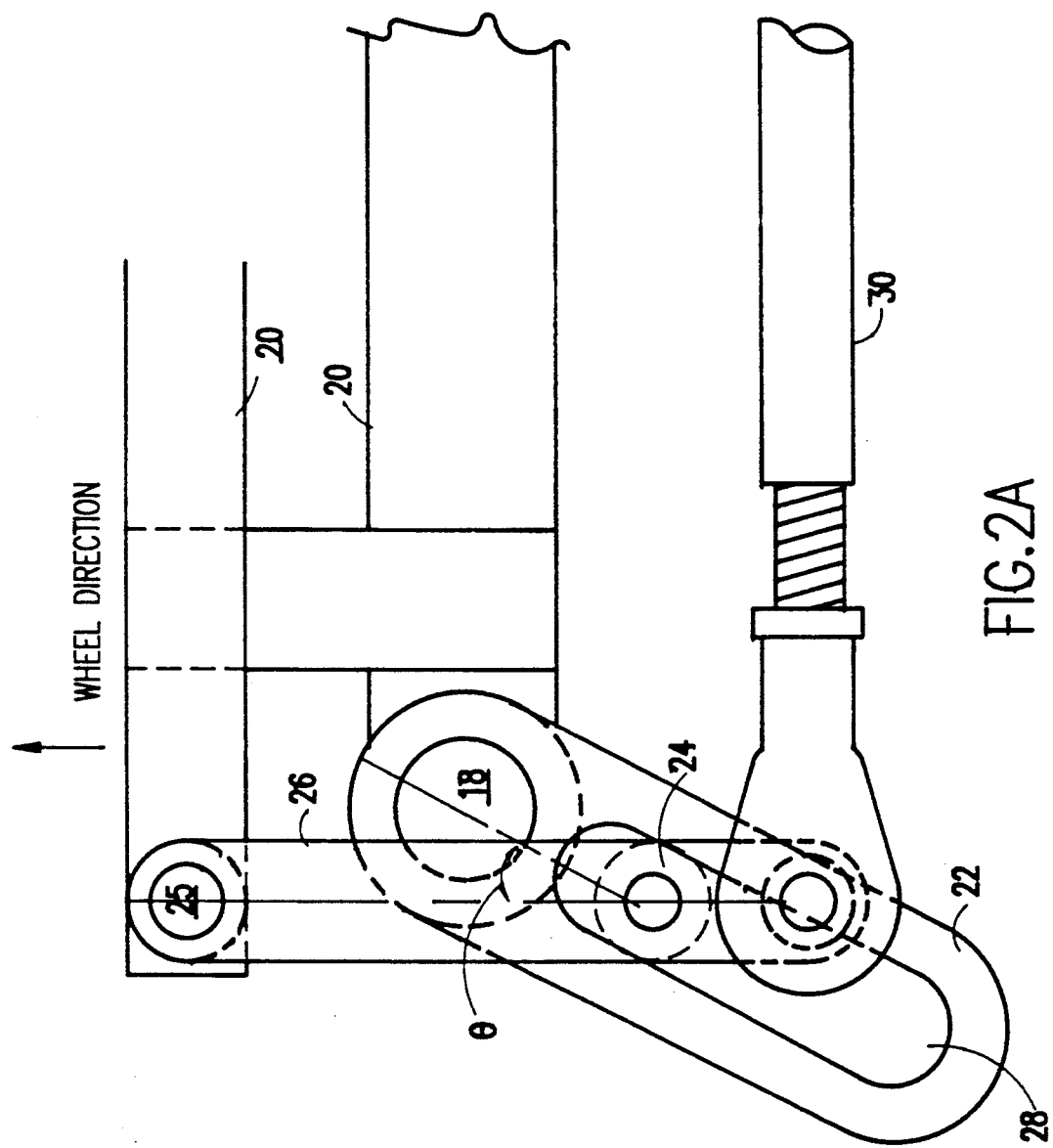

Referring now to FIGS. 1A and 2A, a vehicle indicated by the general reference numeral 10, has a front set of steering wheels 12 and a rear set of wheels 16 mounted on a frame 20. Although the wheels 16 may, if desired, be steerable relative to the frame 20, in this illustrative embodiment they are not. A pair of king pins 18 rotatably mount the wheels 12 to the frame 20. The king pins 18 define a axis vertical or near vertical about which the wheels 12 are steered.

A crank arm 22 is attached to each king pin 18. Each crank arm 22 is driven by steering arm 26. A track roller 24 secured to each sterring arm 26 rides in a slot 28 in each crank arm. A stud 25 pivotally mounts each steering arm 26 to the frame 20 at a point slightly ahead and slightly outboard of the king pin 18. A tie rod 30 is pivotally connected to each steering arm 26 so that the steering arms in combination with the tie rod and the frame form a parallelogram or an approximation of a parallelogram.

The parallelogram formed by the steering arms 26 in combination with the tie rod and frame is a rectangle when the wheels 12 are in a straight-ahead position, as shown in FIGS. 1A and 2A. The steering arms are pivotally secured to the frame forward and outboard of the king pin at distances such that each crank arm forms an angle $\theta$ of about 27 degrees with its respective steering arm when the wheels are in a straight-ahead position.

In steering to the left, the tie rod is moved to the right. This causes each steering arm and its track roller to rotate in a counter-clockwise direction about its pivot point (stud 25) on the frame. In turn, this causes each crank arm to move in a counter-clockwise direction about the king pin axis.

Starting from the straight-ahead wheel position of FIGS. 1A and 2A, the left track roller will initially move along the crank arm slot toward the king pin axis, thereby increasing the angular rate of rotation of the crank arm with to the rate of rotation of the corresponding steering arm.

The linkage for the right wheel is the mirror image of the left side linkage. In a left-hand turn, as the tie rod moves right, it drives the right-hand steering arm to rotate in a counter-clockwise direction, and in turn, the track roller drives the crank arm in a counter-clockwise direction about the king pin axis. On this right side, the track roller moves in the slot away from the king pin axis, so that the rate of angular rotation of the crank arm decreases with respect to the rate of angular rotation of the steering arm.

In turning to the left, with respect to the rotation of the steering arms, the crank arm on the right side rotates more slowly while the crank arm on the left side rotates more quickly, thereby providing correct steering.

Figure 2C:
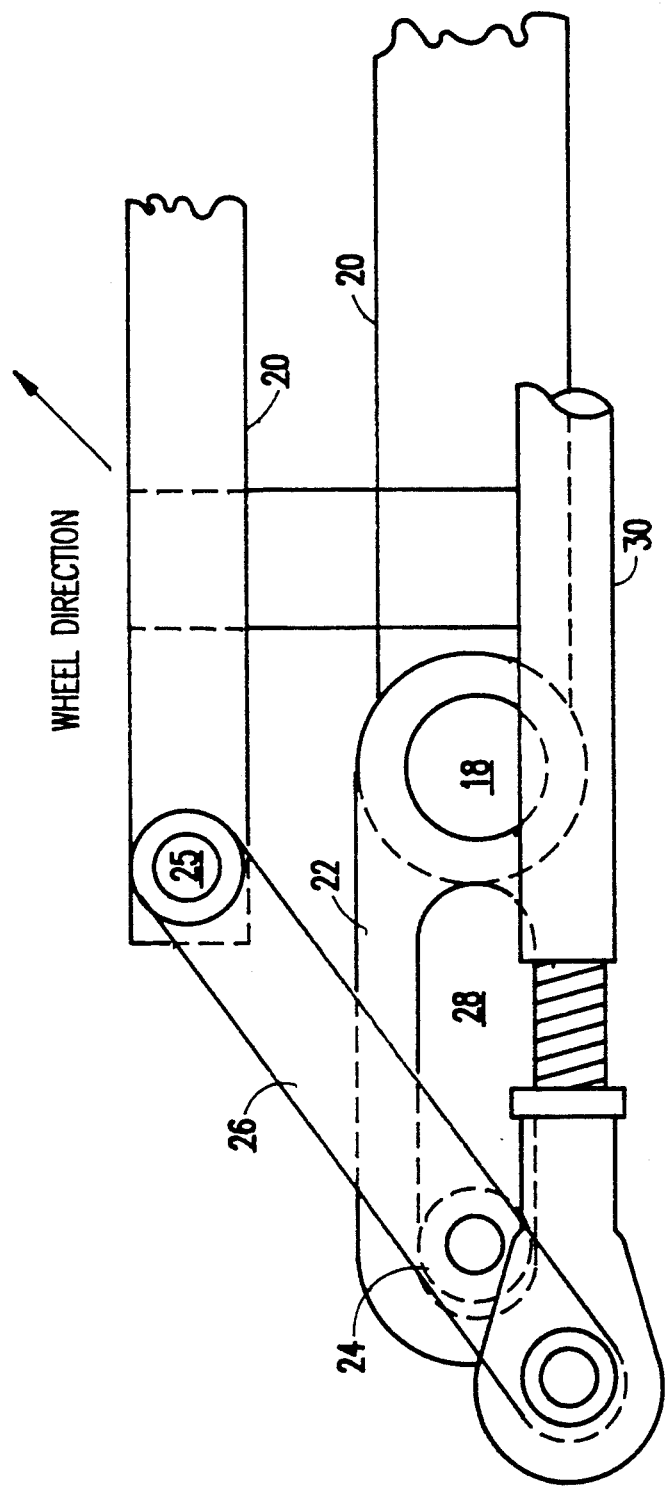

In the full left-turn position, illustrated in FIGS. 1B and 2B, the axes 17 of the wheels 12 intersect on axes 19 of wheels 16 at a point midway between the wheels. The same action as just described, of course, holds for a full right turn. The left-hand linkage position is illustrated in FIG. 2C.

Figure 1C:
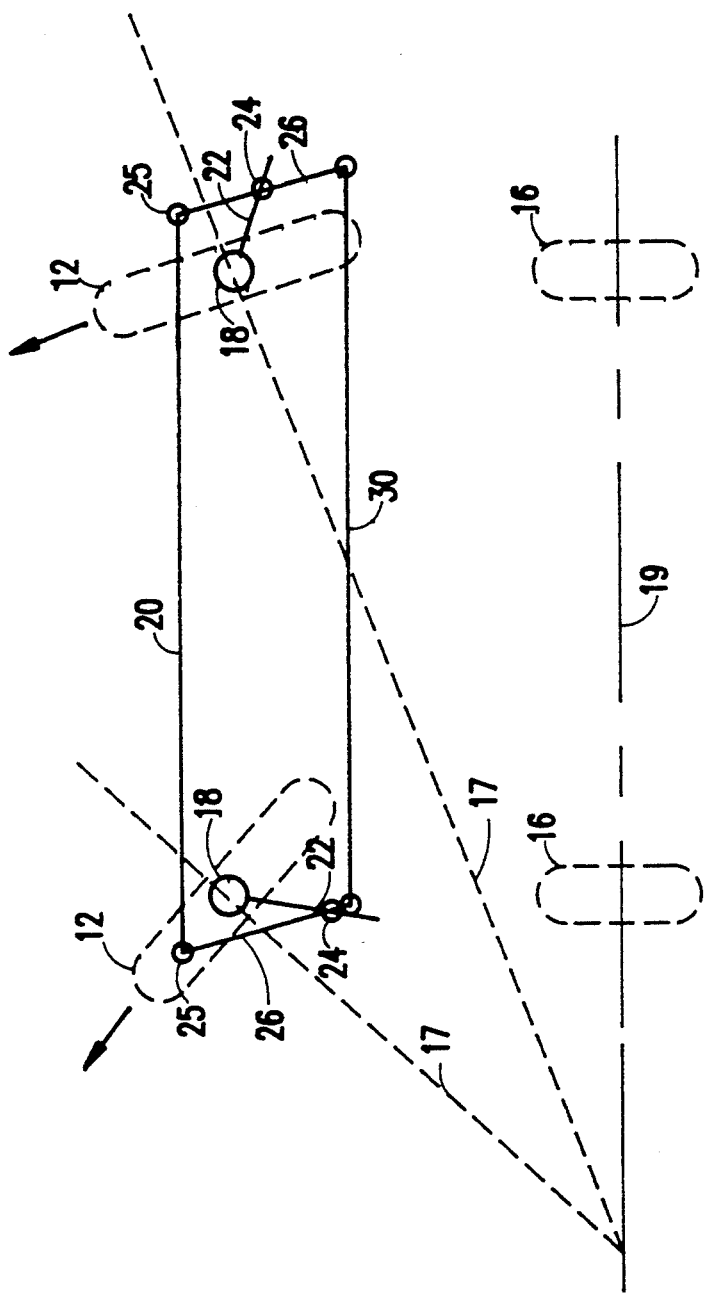

A preferred steering is when the intersection of axes 17 fall on axis 19 as illustrated in FIG. 1C and achieved with this linkage for two positions. The linkage closely approximates this preferred criteria steering if the position of the axes for the steering arm and the king pin and the length of the steering arm from pivot to the axis of the track roller are properly chosen with an initial angle $\theta$ of about 27 degrees. Shaping the slot in the crank arm in the form of a curve instead of a straight line can provide an exact geometric relation.

Figure 3:
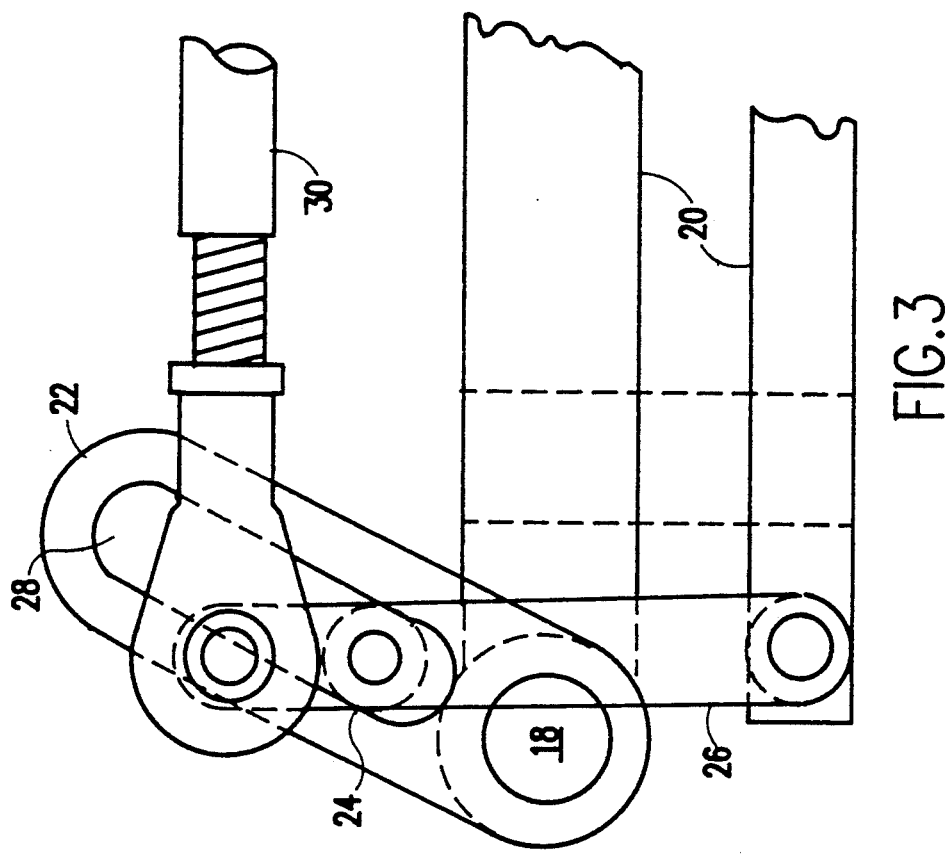
FIG. 3 is a view similar to FIG. 2A showing an alternate embodiment of the invention in which the tie rod is mounted in front of the king pins.

Many variations in structural design and application are possible with the steering linkage while maintaining the basic concepts of the invention. FIG. 3 shows an inversion of the mechanism with the tie rod mounted in front of the king pins. The steering action is identical to that previously described, but it may offer advantages in chassis construction for certain applications.

FIG. 4 shows another alternate construction of the mechanism again with identical steering action to that already described. Here a rod crank arm 22A replaces the slotted crank arm 22, and a sliding member 24A replaces the track roller 24. The sliding member 24A is pivotally secured to the steering arm 26 in the same location as the track roller and slides along the rod 22A.

A typical wheelchair application for the steering linkage of this invention is shown in FIG. 5A. Here the steering linkage and drive motors 31 are mounted on the front wheels 12, providing front-wheel drive and front-wheel steering. The wheelchair frame is indicated by one general reference numeral 20. An alternate application is shown in FIG. 5B. Here the steering linkage and the motors are mounted on the rear wheels 16. This latter arrangement provides good maneuverability, but some loss of directional stability.

A further application of the invention involves mounting a seat of the wheelchair so that it could be rotated 180° about a central post thus allowing the wheelchair to be driven as in 5A or as in 5B.

Another embodiment of this in is shown in FIG. 5C. Here, motors 31 have been added to the front and rear wheels to provide 4-wheel drive with front-wheel steering. In this application, power to the rear wheels must be provided differentially as is common in conventional electric wheelchairs.

Figure 5D:
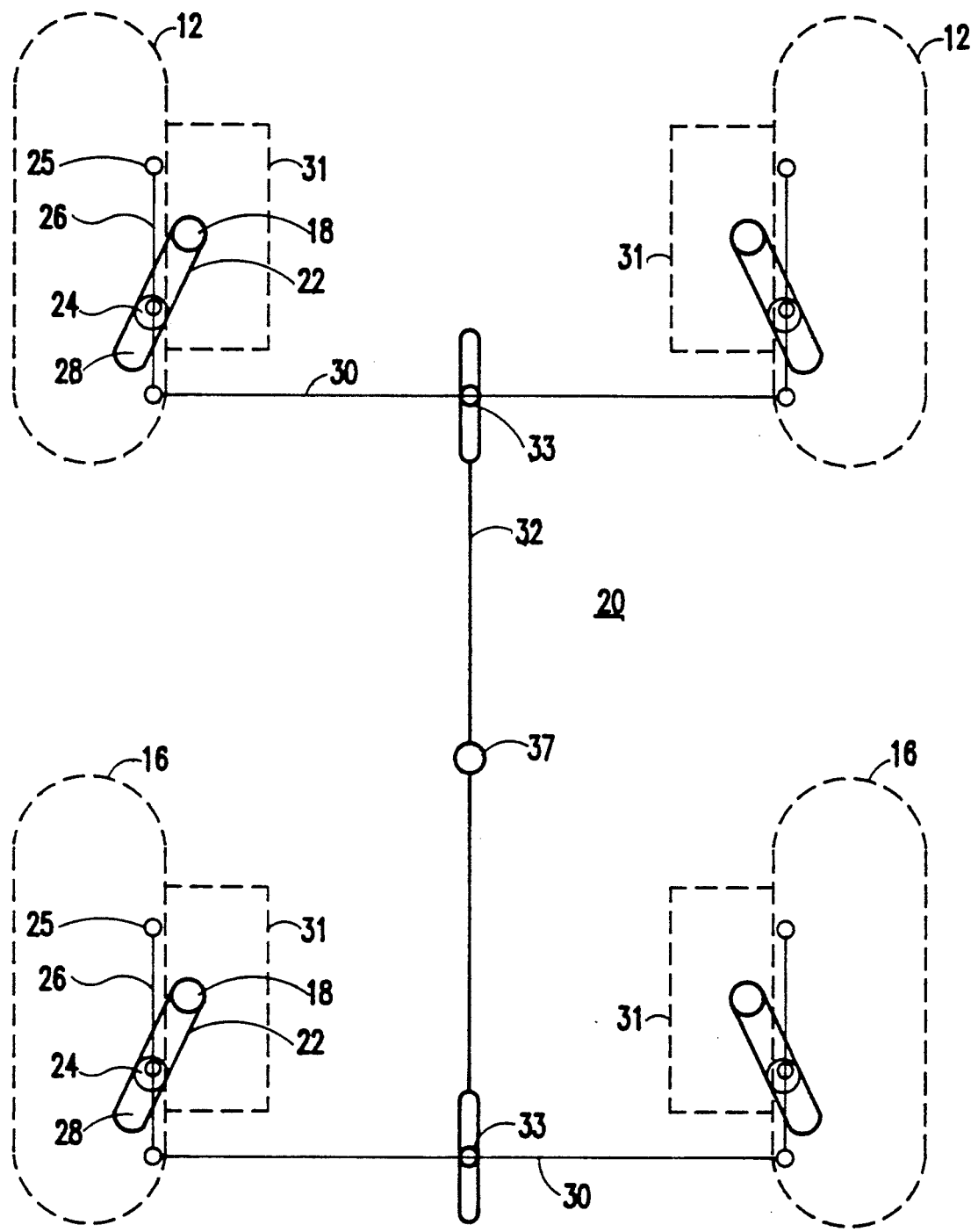
Figure 5E:
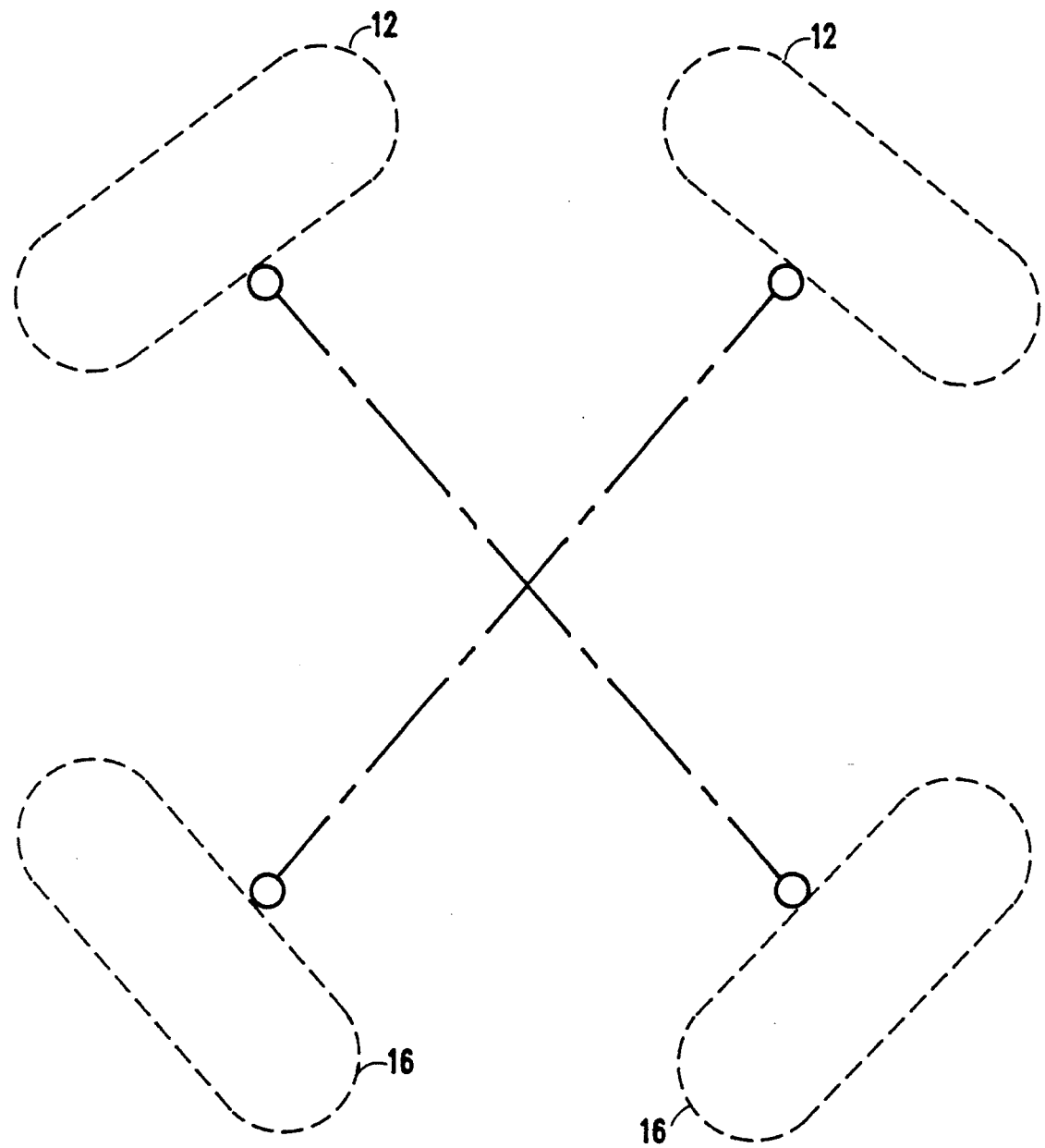

Referring now to FIG. 5D, where both the front and rear wheels are equipped with steering linkage and drive motors, providing 4-wheel drive and 4-wheel steering. In this FIG. 5D, the steering is coordinated by a steering bar 32 pivoted on the frame at 37. A slot in each end of the steering bar 32 engages a track roller 33 mounted centrally on each tie rod. Clockwise rotation of the steering bar 32 causes the front tie rod to move to the right and thus the front wheels to steer to the left. It simultaneously causes the rear tie rod to move to the left and thus the rear wheels to steer to the right. The result is a shorter turning radius for the wheelchair. FIG. 5E shows the position of the wheels for the minimum turning radius with the center of rotation of the wheelchair at the center of the wheelchair.

A further variation in the application of the steering linkage is shown in FIG. 5F shows the steering linkage is mounted on the front wheels 12 and the motors 31 mounted on the rear wheels. In this application, power to the rear wheels should be provided differentially, as is common in conventional electric wheelchairs.

A further variation is the reverse of that shown in FIG. 5F such that the motors are mounted on the front wheels and the steering linkage coupled to the rear wheels.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A vehicle steering mechanism for a four wheel vehicle having two front wheels and two rear wheels, comprising in combination:
   a vehicle frame;
   said two rear wheels comprising a right rear wheel and a left rear wheel mounted on said vehicle frame with a common rotational axis;
   said two front wheels comprising a right front steered wheel having a right front steered wheel rotational axis and a left front steered wheel having a left front steered wheel rotational axis;
   a left and a right king pin rotatably mounting said left and said right front steered wheels respectively to said vehicle frame;

a left steering arm pivotally mounted to said vehicle frame and a right steering arm pivotally mounted to said vehicle frame;

a left crank arm secured to said left king pin;

a right crank arm secured to said right king pin;

a tie rod pivotally secured to said left steering arm at a point outboard of said left king pin;

said tie rod pivotally secured to said right steering arm at a point outboard of said right king pin;

means movably securing said left steering arm to said left crank arm so that said left crank arm extends in an outboard direction and intersects said left steering arm at an acute angle when said left front steered wheel is in a straight ahead position;

means movably securing said right steering arm to said right crank arm so that said right crank arm extends in an outboard direction and intersects said steering arm at an acute angle when said right front steered wheel is in a straight ahead position;

said tie rod, said vehicle frame, said left steering arm, and said right steering arm being pivotally linked together to from a parallelogram so that as said tie rod moves, said left steered wheel and said right steered wheel each turn at a different, but varying, turning rate, whereby said left front steered wheel rotational axis and said right front steered wheel rotational axis intersect at a point that moves along said common rotational axis as is centered between said right rear wheel and said left rear wheel when said tie rod is in its extreme left position and when said tie rod is in its extreme right position.

2. A vehicle steering mechanism for the four wheel vehicle as in claim 1, wherein each said acute angle is approximately 27 degrees.

3. A vehicle steering mechanism as in claim 1, wherein said left steering arm is pivotally mounted to said frame forward of said left king pin and said right steering arm is pivotally mounted to said frame forward of said right king pin.

4. A vehicle steering mechanism as in claim 3, wherein said left crank arm and said right crank arm each have a crank arm slot and said means secured to each of said steering arms movably engaging a respective one of said crank arms in a tract roller that rides in a respective said crank arm slot.

5. A vehicle steering mechanism as in claim 3, wherein said vehicle is a wheelchair and said left and right steered wheels are front wheels.

6. A vehicle steering mechanism as in claim 5, further including motor means coupled to said left and right steered wheels.

7. A vehicle steering mechanism as in claim 1, wherein said left steering arm is pivotally mounted to said frame aft of said left king pin and said right steering arm is pivotally mounted to said frame aft of said right king pin.

8. A vehicle steering mechanism as in claim 1, wherein said left crank arm and said right crank arm each have a crank arm slot and said means secured to each of said steering arms movably engaging a respective one of said crank arms is a tract roller that rides in a respective said crank arm slot.

9. A vehicle steering mechanism as in claim 1, wherein said means secured to each of said steering arms movably engaging a respective one of said crank arms in a slider sleeve.

10. A vehicle steering mechanism as in claim 1, wherein said vehicle is a wheelchair and said left and right steered wheels are front wheels.

11. A vehicle steering mechanism as in claim 10, further including motor means coupled to said left and right steered wheels.

* * * * *